United States Patent
Krause et al.

(10) Patent No.: US 11,365,988 B2
(45) Date of Patent: Jun. 21, 2022

(54) MEASURING SYSTEM AND A MEASURING METHOD FOR THE MEASUREMENT OF A STATOR OF A GEARLESS WIND TURBINE

(71) Applicant: Wobben Properties GmbH, Aurich (DE)

(72) Inventors: Uli Krause, Westerholt (DE); Peter Rosenbusch, Rueil-Malmaison (FR); Rainer Schlüter, Aurich (DE)

(73) Assignee: WOBBEN PROPERTIES GMBH, Aurich (DE)

( * ) Notice: Subject to any disclaimer, the term of this patent is extended or adjusted under 35 U.S.C. 154(b) by 317 days.

(21) Appl. No.: 16/464,416

(22) PCT Filed: Nov. 27, 2017

(86) PCT No.: PCT/EP2017/080477
§ 371 (c)(1),
(2) Date: May 28, 2019

(87) PCT Pub. No.: WO2018/096134
PCT Pub. Date: May 31, 2018

(65) Prior Publication Data
US 2021/0080294 A1 Mar. 18, 2021

(30) Foreign Application Priority Data
Nov. 28, 2016 (DE) ...................... 10 2016 122 862.1

(51) Int. Cl.
*G01D 5/241* (2006.01)
*F03D 17/00* (2016.01)

(52) U.S. Cl.
CPC ........... *G01D 5/2417* (2013.01); *F03D 17/00* (2016.05); *F05B 2260/83* (2013.01)

(58) Field of Classification Search
CPC ............. H02K 2201/03; H02K 7/1838; H02K 11/215; G01B 21/16; G01B 7/14;
(Continued)

(56) References Cited

U.S. PATENT DOCUMENTS

| 6,175,109 B1 | 1/2001 | Setbacken et al. |
| 7,891,938 B2 | 2/2011 | Herron et al. |

(Continued)

FOREIGN PATENT DOCUMENTS

| CN | 101270976 A | 9/2008 |
| CN | 101608911 A | 12/2009 |

(Continued)

OTHER PUBLICATIONS

Vibrosystm, "AGMS: Generator diagnostics through on-line air gap monitoring,"Apr. 26, 2001, XP-002166127, www.vibrosystm.com/frhdroe.html, 10 pages.

*Primary Examiner* — Jermele M Hollington
*Assistant Examiner* — Suresh K Rajaputra
(74) *Attorney, Agent, or Firm* — Seed Intellectual Property Law Group LLP

(57) ABSTRACT

A measuring system and an associated measuring method for measuring a stator of a gearless wind power installation, wherein the measuring system has an air gap measuring unit and a position determination unit, wherein the air gap measuring unit has a holding apparatus and a distance sensor, wherein the holding apparatus is set up to mount the air gap measuring unit on a rotor of the wind power installation, wherein the distance sensor is set up to provide a signal which is indicative of an extent of an air gap between the stator and the rotor, wherein the position determination unit is set up to be mounted on the rotor of the wind power installation and to capture the signal from the distance sensor during a rotation of the rotor at a plurality of (Continued)

revolution positions. The measuring system and the associated measuring method make it possible to measure a stator in a simplified manner.

20 Claims, 7 Drawing Sheets

(58) Field of Classification Search
CPC ...... G01B 7/023; G01D 5/2417; G01D 5/241; G01D 5/2415; F03D 17/00; F05B 2260/83; F05B 2220/706; Y02E 10/72; G01R 27/2605

See application file for complete search history.

(56) References Cited

U.S. PATENT DOCUMENTS

| | | | |
|---|---|---|---|
| 8,092,174 B2 | 1/2012 | Egedal | |
| 8,548,751 B2 | 10/2013 | Lucks | |
| 10,012,215 B2 | 7/2018 | Stoltenjohannes | |
| 10,164,485 B2 | 12/2018 | Laing | |
| 10,428,795 B2 | 10/2019 | Baumgaertel | |
| 2008/0164697 A1 | 7/2008 | Schram et al. | |
| 2009/0015248 A1* | 1/2009 | Moura | G01D 5/147 324/207.26 |
| 2010/0102846 A1 | 4/2010 | Jensen | |
| 2010/0253272 A1 | 10/2010 | Stiesdal et al. | |
| 2011/0291415 A1* | 12/2011 | Damen | H02K 7/1838 290/44 |
| 2014/0184174 A1 | 7/2014 | Diedrichs | |
| 2014/0239974 A1* | 8/2014 | Krummel | G01B 7/14 324/601 |
| 2014/0356162 A1* | 12/2014 | Fasolo | F03D 9/25 416/1 |
| 2015/0234011 A1* | 8/2015 | Cloutier | G01R 31/343 318/490 |
| 2015/0292857 A1 | 10/2015 | Lu et al. | |

FOREIGN PATENT DOCUMENTS

| | | |
|---|---|---|
| CN | 101868620 A | 10/2010 |
| CN | 104603453 A | 5/2015 |
| CN | 104956072 A | 9/2015 |
| CN | 105226848 A | 1/2016 |
| CN | 106104974 A | 11/2016 |
| EP | 0067643 A2 | 12/1982 |
| EP | 1835293 A1 | 9/2007 |
| EP | 2275776 A2 | 1/2011 |
| EP | 2896827 A1 | 7/2015 |
| JP | 2000180213 A | 6/2000 |
| RU | 2318184 C1 | 2/2008 |
| RU | 2557260 C1 | 7/2015 |
| RU | 2558641 C1 | 8/2015 |
| SU | 1663404 A1 | 7/1991 |

* cited by examiner

MEASURING SYSTEM AND A MEASURING METHOD FOR THE MEASUREMENT OF A STATOR OF A GEARLESS WIND TURBINE

BACKGROUND

Technical Field

The invention relates to a measuring system and a measuring method for measuring a stator of a gearless wind power installation.

Description of the Related Art

In a gearless wind power installation, a generator of the wind power installation comprises a rotor which is moved, directly and without a transmission, via a rotation of the rotor blades connected to the aerodynamic rotor. One design possibility is in the form of an internal rotor such that the rotor rotates inside the stator. In this design, the rotor is often inserted into the stator on an end face, that is to say from a side which is substantially directed into the wind during normal operation.

Between the rotor and the stator, there is an air gap which, if possible, has a uniform thickness, that is to say an extent in the radial direction around the generator axis, over the circumference of the rotor or the stator.

For this purpose, it is necessary for the stator to provide an inner surface which is as round as possible and within which the rotor can be fitted. In order to ensure the roundness of the stator, a complicated method has hitherto been required when assembling the wind power installation, in which method the wind power installation is moved into many rotor positions and is stopped. In each of these rotor positions, the distance between a fixed reference point of the rotor and a variable point of the stator corresponding to the respective rotor position is manually determined. For the manual determination, an engineer climbs into the rotor hub, which is why the installation must then be stopped. After the engineer has left the region of the rotor hub after the measurement, the rotor can be moved into the next measurement position and can be measured again.

The known method has a plurality of disadvantages. For example, it is disadvantageous and time-consuming that the wind power installation has to be frequently started up and stopped since an engineer must reach the rotor hub or that side of the generator which faces the spinner at a plurality of times. There is also no possible way of determining the position in the circumferential direction of the stator, to which particular measured values can be assigned. Finally, it is not possible to directly and immediately measure effects of setting or adjusting the stator.

BRIEF SUMMARY

Provided are a measuring system and an associated measuring method which solves at least some of these known problems and avoids disadvantages. In particular, provided is a measuring system and an associated measuring method which makes it possible to measure a stator in a simplified manner.

Provided is a measuring system for measuring a stator of a gearless wind power installation. The measuring system has an air gap measuring unit and a position determination unit. The air gap measuring unit has a holding apparatus and a distance sensor. The holding apparatus is set up to mount the air gap measuring unit on a rotor of the wind power installation. The distance sensor is set up to provide a signal which is indicative of an extent of an air gap between the stator and the rotor. The position determination unit is set up to be mounted on the rotor of the wind power installation and to provide a signal which is indicative of a position of the position determination unit in the revolution direction of the rotor. The measuring system is set up to capture signals from the distance sensor and from the position determination unit during a rotation of the rotor at a plurality of revolution positions.

The measuring system can therefore be mounted in the wind power installation before the beginning of the measurement and is set up to capture the air gap during the rotation of the rotor. This dispenses with the need to stop the rotor at a plurality of positions in the circumferential direction and to then manually capture or measure the air gap. This is made possible by virtue of the fact that the air gap measuring unit and the position determination unit rotate together with the rotor since they are mounted on the rotor.

As a result of the fact that the position determination unit can also be mounted on the rotor and therefore rotates with the rotor, like the air gap measuring unit, it is possible to easily connect the air gap measuring unit to the position determination unit. In particular, twisting or the like of a connection cable between the position determination unit and the air gap measuring unit cannot result from the rotation of the rotor.

The air gap is preferably formed between a pole shoe on the rotor side and a stator ring on the stator side. In other configurations of the wind power installation or of the generator, the air gap may also be formed between other elements on the stator side and on the rotor side.

The measuring system is preferably portable and reusable by virtue of the fact that the air gap measuring unit and the position determination unit can be reversibly mounted on the rotor.

The holding apparatus is preferably also set up to alternatively mount the measuring unit on the stator of the wind power installation. In this position too, the distance sensor is set up to provide the signal indicative of an extent of the air gap. During a rotation of the rotor, the evaluation unit can therefore capture the distance between a fixed position of the stator and different positions of the rotor and can carry out a rotor concentricity measurement. The measuring system is therefore suitable both for measuring the stator and for measuring the concentricity of the rotor. In the case of the rotor concentricity measurement as well, there is no need to stop the rotor at a plurality of positions in order to be able to manually capture the air gap.

In this embodiment, the distance sensor can therefore provide a signal which is indicative of a distance between the stator and preferably the pole shoes on the rotor side. A larger distance can be detected in an intermediate space between two adjacent pole shoes, with the result that the different pole shoes of the rotor can be identified by evaluating the temporal profile of the distance. In one embodiment, the number of pole shoes of the rotor is preferably specified to the measuring system, with the result that the relative position of the rotor in the revolution direction is possible by counting the pole shoes on the basis of the measurement signal from the distance sensor. In this embodiment, a position determination unit mounted on the rotor is therefore preferably not necessarily required since the rotor position can be determined by counting the pole shoes. The rotor concentricity is preferably determined using a minimum of the distance for each pole shoe. In other embodiments, however, the rotor concentricity can also be measured using values which differ from the minimum, for example using an average value. For example, in a case of an Enercon E-115 installation, the rotor has 96 pole shoes in the revolution direction. Other numbers of pole shoes are also known for other wind power installations.

The holding apparatus preferably comprises a magnetic film, wherein the air gap measuring unit is set up to be mounted in the air gap, in particular on a pole shoe of the rotor. The magnetic film makes it possible for the air gap measuring unit to be reversibly mountable and to be reusable for a plurality of uses.

In one embodiment, the magnetic film has a thickness of approximately 0.3 mm but can also be designed differently in other embodiments, in which case the hold of the air gap measuring unit on the rotor is ensured.

The position determination unit preferably has a gyroscope which is set up to provide a signal indicative of the position of the rotor. The gyroscope signal can be captured at a high sampling rate and can therefore ensure a high resolution. The sampling rate of the position determination unit then preferably corresponds to the sampling rate of the air gap measuring unit, and corresponding air gap and position values can be captured.

The position determination unit alternatively or additionally preferably has an incremental encoder which is set up to provide a signal for each determined angle change of the rotor. The position determination unit is therefore preferably set up to capture the signal from the distance sensor for each determined angle change of the rotor indicated by the incremental encoder.

The incremental encoder preferably has a resolution of at least 100 positions per revolution. The resolution of the incremental encoder is known, and the individual positions are preferably at an equal distance from one another, with the result that the position of the individual measurement points can be easily determined. A high resolution makes it possible to locate the captured distance values in an advantageous and accurate manner. It is therefore likewise advantageously known when a complete revolution has been concluded and the measurement can be easily repeated by means of a further revolution.

The position determination unit preferably has a referencing unit for referencing the incremental encoder. As a result of the referencing, not only the relative position, which is known by the incremental encoder between two measurement points, but rather the absolute position is possible. For example, the referencing unit may comprise a pendulum in which a 12 o'clock position can be discerned. In other words, the air gap measuring unit is mounted, for example, at the 12 o'clock position, that is to say at that position of the rotor which is highest in the vertical direction, and the incremental encoder is then referenced in such a manner that the referencing unit likewise corresponds to the value of the 12 o'clock position. In other embodiments, other reference values which do not correspond to the 12 o'clock position are naturally likewise also possible.

In one exemplary embodiment, the referencing unit comprises a pendulum which is set up in such a manner that a lamp, for example an LED, emits light as soon as the referencing unit is at the 12 o'clock position. Accordingly, in this embodiment, the incremental encoder can be adjusted, for example rotated, until the LED belonging to the referencing unit emits light. Simple referencing is therefore possible. In other embodiments, other ways of referencing the incremental encoder are naturally also possible.

The holding apparatus is preferably set up to be mounted on an end face in front of the rotor. Holes are usually present on the end face in front of the rotor; for example, screws can be released from an air plate and the holding apparatus can even be mounted using the same screws. This ensures simple mounting of the air gap measuring unit. In other embodiments, the holding apparatus can also alternatively or additionally be mounted on that side of the rotor which faces away from the end face if the measuring system has a plurality of measuring units.

The measuring system preferably has a housing. The housing comprises the position determination unit and is set up to be mounted on struts for a spinner cap of the wind power installation. The struts for the spinner cap are always present in the wind power installation, and the housing and therefore the position determination unit can thus be mounted without any additional outlay. For example, the housing can be temporarily mounted on the struts by means of simple cable ties or similar fastening means.

In one embodiment, the housing comprises a magnet, in particular a permanent magnet, wherein the housing can be releasably mounted on a magnetic part of the rotor by means of the magnet.

In one embodiment, the position determination unit and the air gap measuring unit can also be arranged in a common housing which can be mounted, for example, on an end face of the rotor.

The position determination unit preferably has a radio communication module, in particular a WLAN module. The radio communication module makes it possible to establish a simple connection to a computer, for example in the machine cabin of the wind power installation, without having to lay cables for this purpose. It is therefore possible to easily analyze and evaluate the measurement by means of the computer which does not concomitantly rotate. In other words, adjustments and adaptations of the stator can therefore already be made during a rotation of the rotor and a recording of the measurement results since there is no need for engineers to be present in the region of the rotor hub and associated stopping of the installation.

The distance sensor preferably has a sensing plate which is set up to scan an inner side of the stator in the mounted state. In particular, the sensing plate is arranged in such a manner that it rests on stator laminated cores from the inside. Other types of measuring apparatus, for example optical such as laser-based measuring apparatus, which are suitable for determining the distance can also be used as an alternative or in addition to the sensing plate. The distance sensor can likewise be similarly applied to an external rotor, wherein the distance sensor then preferably scans the outer side of the stator starting from the revolving rotor.

Alternatively or additionally, the distance sensor has a capacitive flat sensor. The capacitive flat sensor is set up, in particular, to be mounted directly in the air gap and to provide a signal which is indicative of a thickness of the air gap.

The distance sensor preferably enables a measurement accuracy of 0.5 mm or better. Despite its diameter of greater than 4 m, for example, the air gap has a small thickness of a few millimeters. This makes such accuracy necessary since fluctuations in this range can already have great effects.

The distance sensor preferably provides an analog scanning signal, and the position determination unit has an analog/digital converter which is set up to digitize the scanning signal. This enables a particularly simple configuration of the air gap measuring unit. Alternatively, in other embodiments, the air gap measuring unit can also directly have a digital distance sensor.

The position determination unit preferably has a transformer so that the position determination unit can be directly connected to the grid voltage. In particular, it is therefore possible for the position determination unit or the entire measuring system to be able to be connected to existing supply grids, for which a wide availability is ensured, without difficulties. For example, 220 V sockets can be found on the German market—similarly applicable to other markets—and enable simple connection. The position determination unit particularly preferably has a first transformer, which provides a 24 V output voltage for the entire position determination unit, and alternatively or additionally a second transformer, which provides a 5 V output voltage for the distance sensor.

The measuring system preferably has a first and a second air gap measuring unit, wherein the first air gap measuring unit is set up for mounting in front of the rotor in the axial direction and the second air gap measuring unit is set up for mounting behind the rotor in the axial direction. Such a measuring system makes it possible to align the stator both axially at the front and at the rear on the basis of the measurement of the measuring system. In addition to the alignment in the rotor plane, tilting with respect to the rotor plane can therefore also be detected. In other words, the first air gap measuring unit is preferably mounted on the spinner side and the second air gap unit is mounted on the machine cabin side on the same pole shoe of the rotor.

Although the configurations have each been described independently of one another as preferred embodiments, particularly advantageous designs of the measuring system are produced by combining two or more of the embodiments described as preferred.

A further aspect provides a measuring method for measuring a stator of a gearless wind power installation. The measuring method comprises the following steps of: (i) mounting an air gap measuring unit, which has a holding apparatus and a distance sensor, on a rotor of the wind power installation, (ii) mounting a position determination unit on the rotor of the wind power installation, (iii) capturing a signal from the distance sensor, which is indicative of an extent of an air gap between the stator and the rotor, by means of the position determination unit during a rotation of the rotor at a plurality of revolution positions.

The measuring method is preferably carried out using the measuring system and is suitable, in particular, for achieving the advantages described with respect to the measuring system. All advantageous configurations described for the measuring system can also be applied in the same form to the measuring method.

The signal from the distance sensor is preferably captured for each measurement position indicated by an incremental encoder. A composite image of the change in the air gap over the circumference of the stator therefore results. For example, the values from the incremental encoder and the associated value from the distance sensor can be stored as a list and can then be processed by means of suitable software, for example a spreadsheet. Furthermore, the values from the distance sensor can also be represented in a spider chart, wherein the circular arrangement preferably corresponds to the revolution direction. This makes it possible to represent the roundness of the stator, and also the regions of the stator in which the stator is not round and should be readjusted, in a graphically simple and intuitive manner.

The method preferably comprises connecting the position determination unit to a grid voltage. The method alternatively or additionally preferably comprises calibration of the distance sensor.

The method preferably comprises referencing an incremental encoder for absolute position determination during a revolution. In addition to the relative position change indicated by the incremental encoder, the absolute position can therefore also be reliably captured.

The method preferably comprises transmitting the captured signals by WLAN. This makes it possible for an engineer in the non-rotating part of the wind power installation to easily evaluate the data. Furthermore, no cable needs to be laid from the rotating part of the wind power installation to the part which is fixed in terms of rotation for this purpose. WLAN is particularly suitable as a result of good availability and favorable costs. However, other radio transmission protocols can naturally also be similarly implemented as an alternative to WLAN.

Another aspect provides a measuring method for measuring a rotor of a gearless wind power installation, wherein the measuring method comprises the following steps of: mounting an air gap measuring unit, which has a holding apparatus and a distance sensor, on a stator of the wind power installation, capturing a signal from the distance sensor, which is indicative of an extent of an air gap between the stator and the rotor, during a rotation of the rotor at a plurality of revolution positions, determining junctions between pole shoes of the rotor from the signal from the distance sensor, determining a distance value between the stator and the rotor for each pole shoe between each two adjacent junctions of the determined junctions, in particular as a minimum of the signal from the distance sensor, and evaluating a roundness of the rotor on the basis of the distance value determined for each pole shoe.

In this aspect, the measuring method can optionally have the position determination unit which is mounted on the rotor since the position can already be determined on the basis of the pole shoes which can be derived from the measurement signal. Since no parts which rotate with the rotor are therefore required, no complicated cable routing or connection between rotating and non-rotating parts is needed to carry out the measuring method either.

Two air gap measuring units are preferably mounted on both axial sides of the stator, namely on the housing side and on the hub side. Deviations between the housing-side distance sensor and the hub-side distance sensor can therefore be used to correct tilting of the rotor with respect to the generator axis. However, the measuring method can also naturally be carried out only with one air gap measuring unit, which is mounted either on the housing side or on the hub side, or with more than two air gap measuring units.

Another aspect provides a method for assembling a wind power installation, which comprises carrying out a measuring method and also adjusting the stator and/or the rotor at a position at which a differing value of the air gap was measured. Non-round regions which arise when mounting the stator or the rotor can hereby be corrected in a particularly simple manner and with little effort.

BRIEF DESCRIPTION OF THE SEVERAL VIEWS OF THE DRAWINGS

Further advantageous configurations and embodiments are described below with reference to accompanying figures, in which.

DETAILED DESCRIPTION

Figure 1:
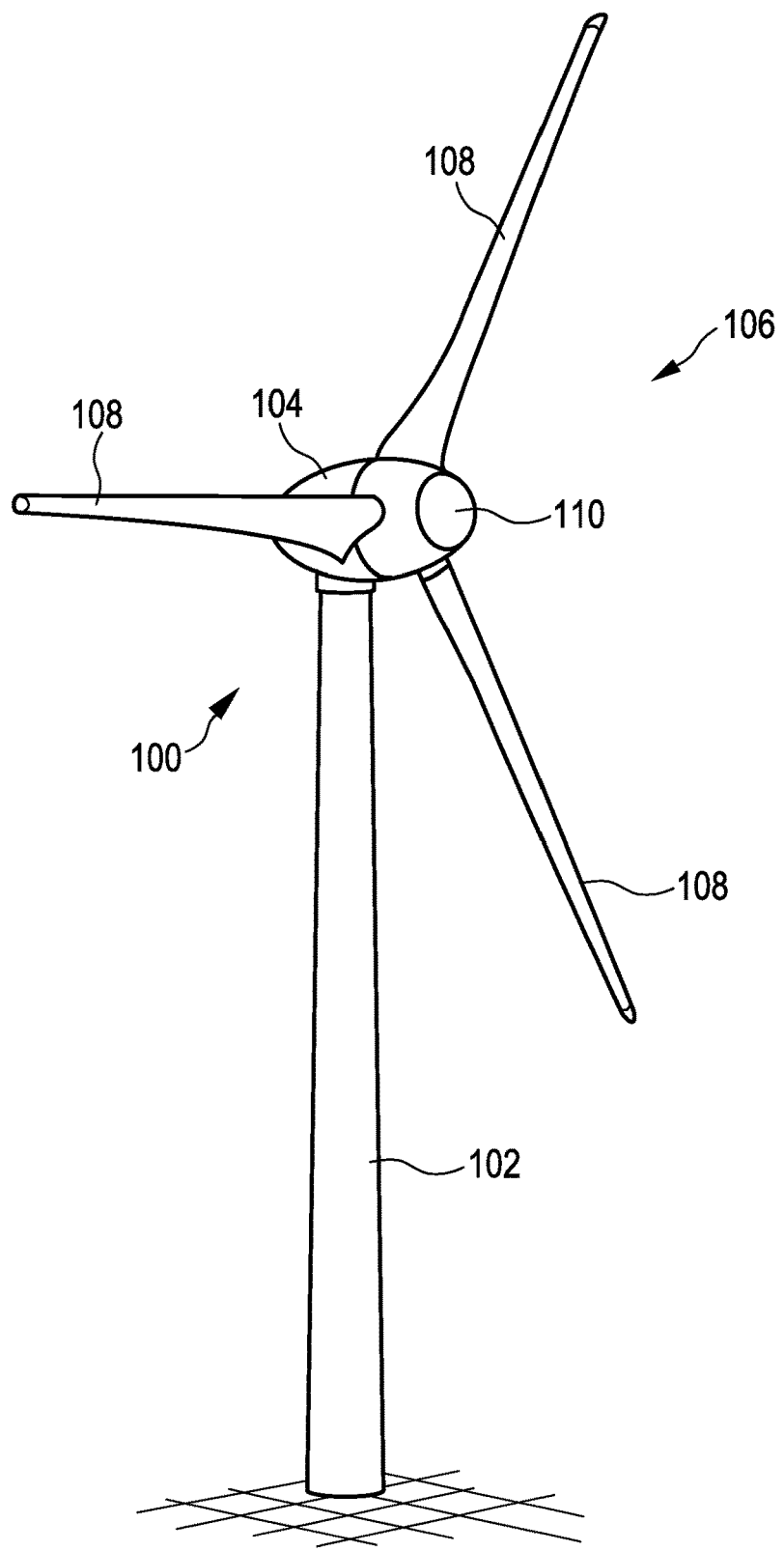
FIG. 1 schematically shows a wind power installation,
FIG. 2 schematically shows a wind farm,
FIG. 3 schematically shows a generator of a wind power installation shown in FIG. 1, FIG. 4 schematically shows an exemplary embodiment of a measuring system according to the invention.

FIG. 1 shows a schematic illustration of a wind power installation 100. The wind power installation 100 has a tower 102 and a nacelle 104 on the tower 102. An aerodynamic rotor 106 having three rotor blades 108 and a spinner 110 is provided on the nacelle 104. The aerodynamic rotor 106 is caused to rotate by the wind during operation of the wind power installation and therefore also rotates an electrodynamic rotor of a generator which is directly coupled to the aerodynamic rotor 106. The electrical generator is arranged in the nacelle 104 and generates electrical energy.

Figure 2:
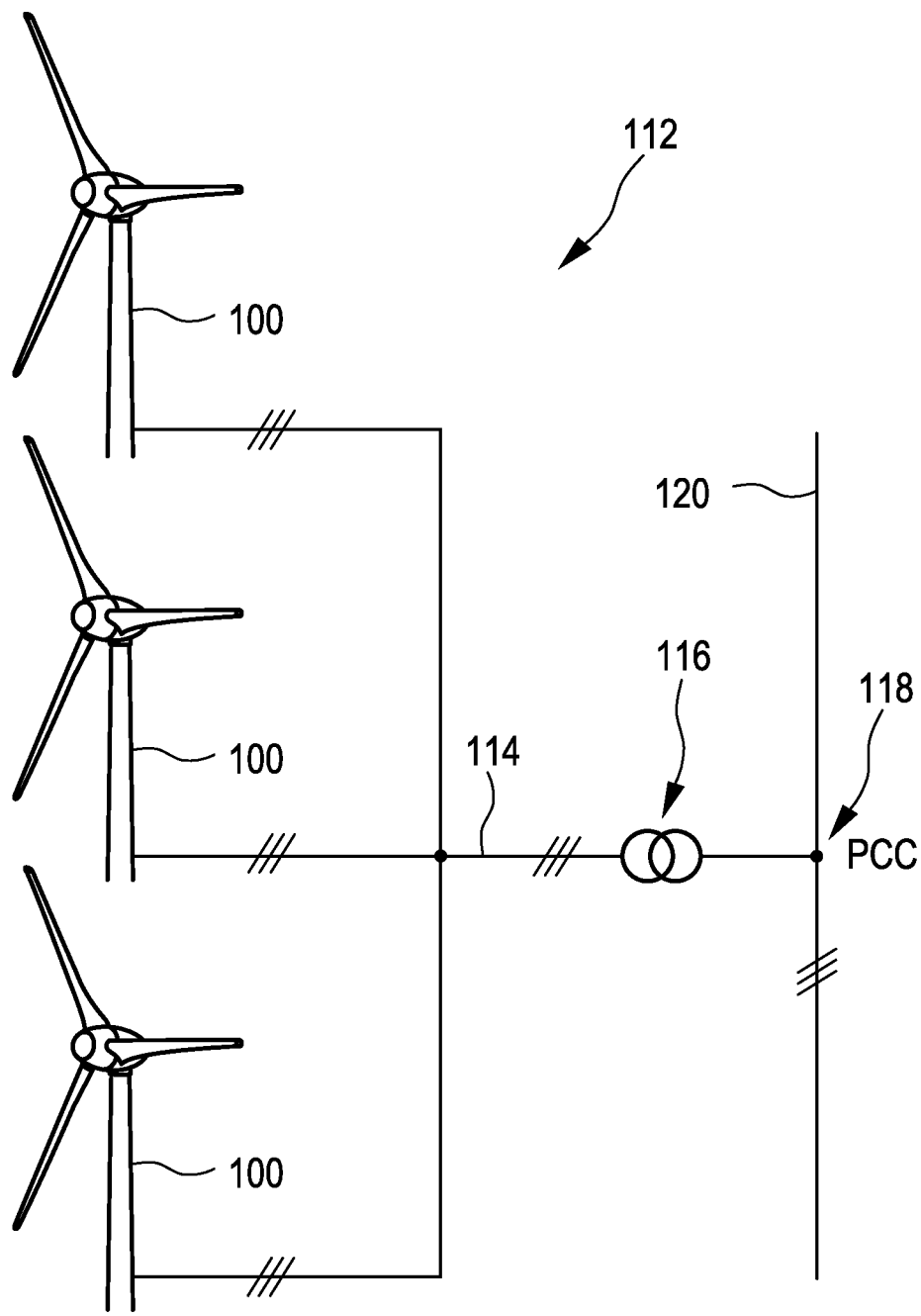

FIG. 2 shows a wind farm 112 having, by way of example, three wind power installations 100 which may be identical or different. The three wind power installations 100 are therefore representative of fundamentally an arbitrary number of wind power installations in a wind farm 112. The wind power installations 100 provide their power, namely in particular the generated current, via an electrical farm network 114. In this case, the respectively generated currents or powers from the individual wind power installations 100 are added, and a transformer 116 is usually provided and steps up the voltage in the farm in order to then feed it into the supply grid 120 at the feed-in point 118 which is also generally referred to as the PCC. FIG. 2 is only a simplified illustration of a wind farm 112 which does not show a controller, for example, even though a controller is naturally present. The farm network 114 can also be configured differently, for example, by virtue of a transformer also being present, for example, at the output of each wind power installation 100, to name just one other exemplary embodiment.

Figure 3:
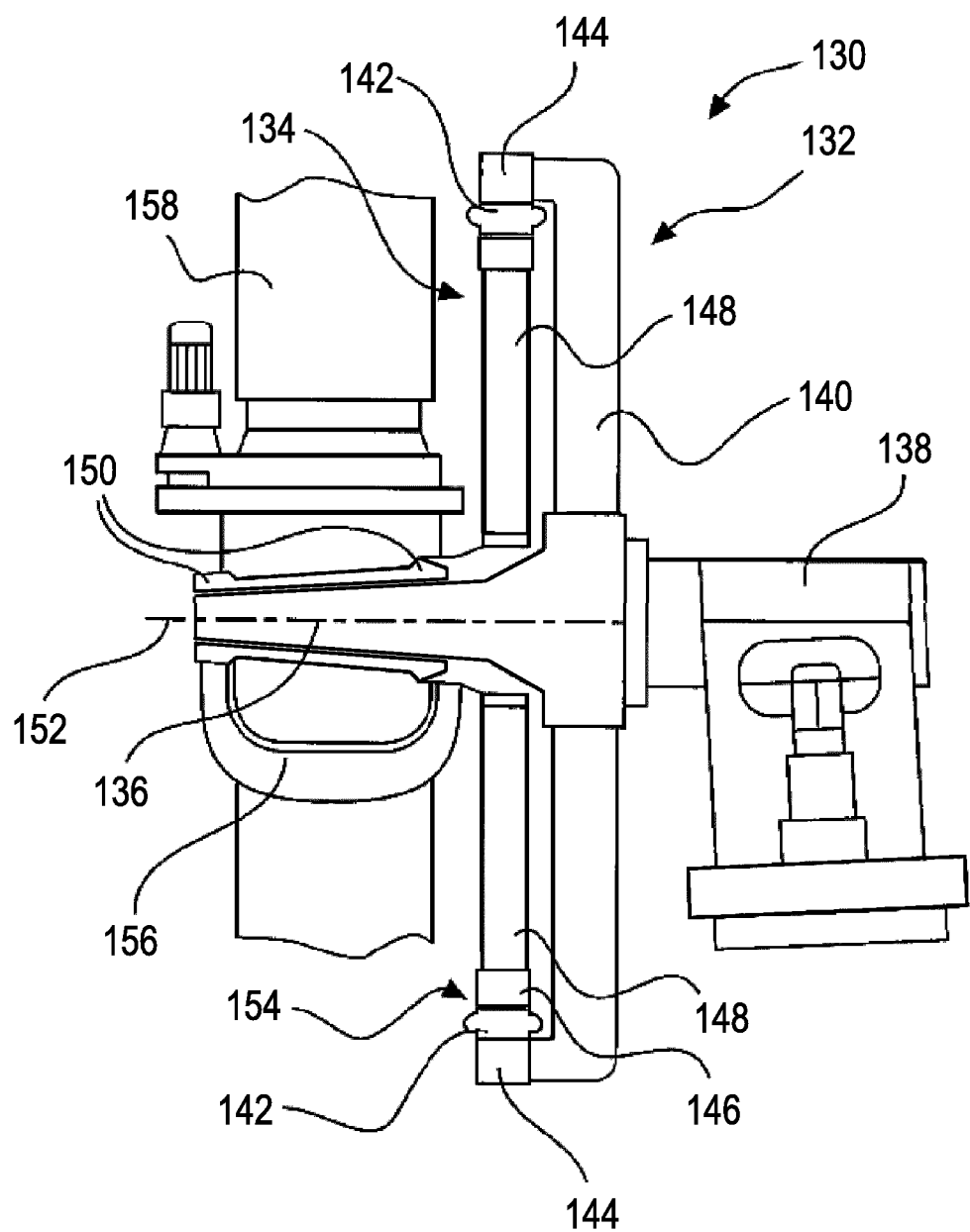

FIG. 3 schematically shows a side view of a generator 130. The generator 130 has a stator 132 and an electrodynamic rotor 134 rotatably mounted with respect to the latter and is fastened, by its stator 132, to a machine support 138 via an axle journal 136. The stator 132 has a stator carrier 140 and stator laminated cores 142 which form stator poles of the generator 130 and are fastened to the stator carrier 140 via a stator ring 144. The electrodynamic rotor 134 has rotor pole shoes 146 which form the rotor poles and are rotatably mounted about the axis of rotation 152 via a rotor carrier 148 and bearings 150 on the axle journal 136. Only a narrow air gap 154 which is a few millimeters thick, in particular less than 6 mm, but has a diameter of several meters, in particular more than 4 m, separates the stator laminated cores 142 and the rotor pole shoes 146. The stator laminated cores 142 and the rotor pole shoes 146 respectively form a ring and together are also annular, with the result that the generator 130 is a ring generator. As intended, the electrodynamic rotor 134 of the generator 130 rotates together with the rotor hub 156 of the aerodynamic rotor, of which beginnings of rotor blades 158 are indicated.

Figure 4:
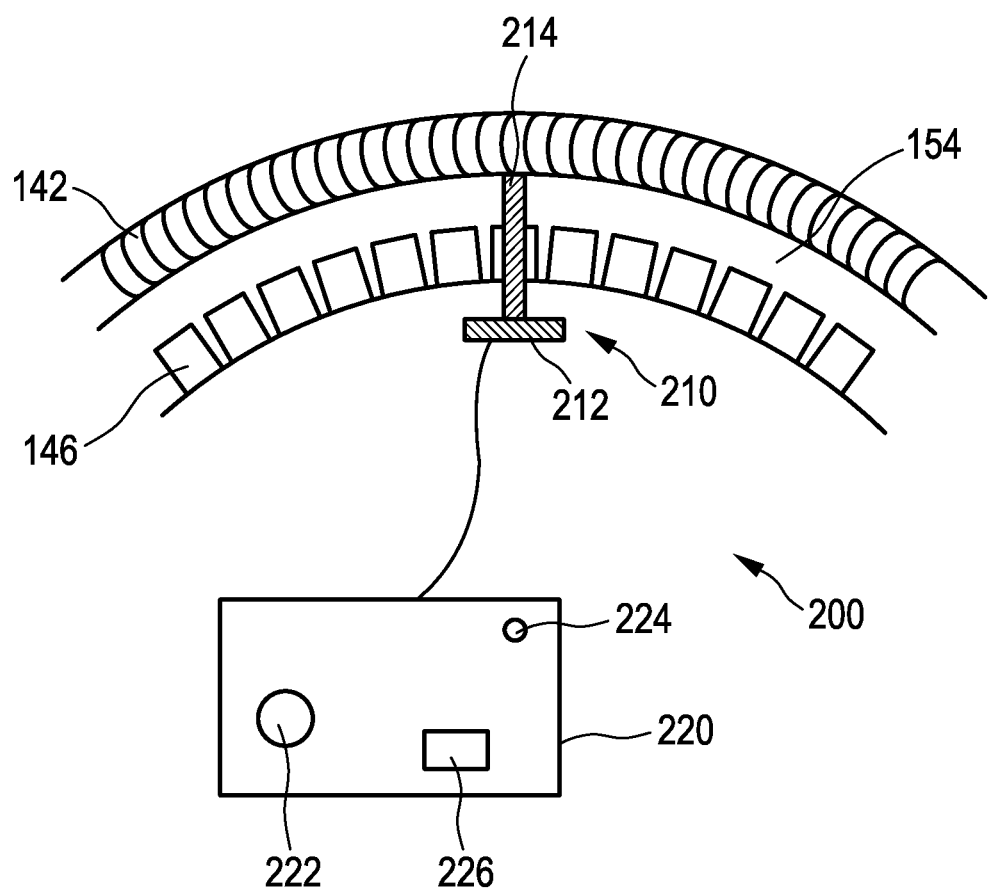

FIG. 4 schematically shows an exemplary embodiment of a measuring system 200 for measuring a stator 132 of a generator 130, as shown in FIG. 3. FIG. 4 shows the stator shown in FIG. 3 from the front, more precisely a section of the upper part of the stator laminated cores 142 and the rotor pole shoes 146. For the purpose of simplifying the illustration, the further elements indicated in FIG. 3 have been omitted.

The measuring system 200 has an air gap measuring unit 210 and a position determination unit 220.

The air gap measuring unit 210 comprises a holding apparatus 212 which is simultaneously set up for mounting on the rotor and for holding a distance sensor 214. The holding apparatus 212 can be mounted on an air plate on the end face of the rotor 134 (cf. FIG. 3) by means of two screws, for example. The air plate (not shown) is naturally only one example on which the air gap measuring unit 210 is mounted. The advantage of the air plate is that it is usually already present in the wind power installations and also keeps available holes which are suitable for mounting the holding apparatus. In this exemplary embodiment, the distance sensor 214 has a holding plate and determines the distance between stator laminated cores 142 and rotor pole shoes 146 in an analog form. A signal which is indicative of the extent of the air gap 154 is transmitted from the distance sensor 214 to the position determination unit 220. In this exemplary embodiment, a cable is provided for the purpose of transmitting the measurement signal but, in other exemplary embodiments, the measurement signal can also be transmitted in a wireless manner or the air gap measuring unit 210 may be in the form of an integral unit with the position determination unit 220.

In this exemplary embodiment, the position determination unit 220 has an incremental encoder 222, a referencing unit 224 and a radio communication module or device 226. In this case, the position determination unit 220 is illustrated as a box inside a housing which is likewise mounted, together with the rotor, in the vicinity of the air gap measuring unit 210. The air gap measuring unit 210 and the position determination unit 220 therefore rotate when the rotor pole shoes 146 rotate with respect to the stator laminated cores 142. In other words, the stator laminated cores 142 rotate relative to the air gap measuring unit 210 and the position determination unit 220.

The incremental encoder 222 is set up to indicate a position of the position determination unit 220. In particular, the incremental encoder 222 is set up to indicate a position change over a particular angular range. The resolution of the incremental encoder 222 is preferably at least 100 positions per revolution. A sufficient measurement resolution is therefore provided and ensures positioning of the stator 132 over the entire revolution.

The referencing unit 224 is provided for the purpose of indicating an absolute position of the incremental encoder 222. FIG. 4 shows an indication of the referencing unit 224 which emits light whenever the incremental encoder 222 is in a 12 o'clock position, that is to say vertically upward. For example, the referencing unit 224 may comprise a pendulum (not shown) for the purpose, wherein the lamp of the referencing unit 224 shown in FIG. 4 emits light when the position corresponds to the 12 o'clock position, that is to say when the pendulum is vertically downward. The incremental encoder 222 is preferably rotated in one direction, that is to say referenced, until the lamp of the referencing unit 224 emits light. When the incremental encoder 222 is referenced at the 12 o'clock position, it is possible, since the intervals of the incremental encoder 222 are constant and the number of measurement positions for each revolution is also known, to compare a plurality of measurements with one another, even over different days and between different wind power installations, since they contain the same absolute reference points.

The radio communication module 226 is preferably a WLAN module or device which enables a WLAN connection or other wireless communication connection to a computer in the machine cabin of the wind power installation 100. An engineer adjusting the stator 132 or the stator laminated cores 142 can therefore receive the data relating to the air gap 154 outside the rotating rotor by means of the radio communication module 226, can evaluate said data and can accordingly react to said data, for example by adjusting the stator 132. The wireless transmission of the data means that no cable needs to be routed to the outside from the interior of the rotor, which entails the risk of cable twisting.

FIG. 4 does not explicitly show further elements of the position determination unit 220, namely the computing unit which comprises the radio communication module 226, for example, an analog/digital converter which, for example if the sensor 214 is an analog sensor, converts the scanning signal from the sensor 214 into a digital signal, and at least one power supply unit which converts a grid voltage into a voltage required by the position determination unit 220 or a voltage required by the air gap measuring unit 210. The position determination unit 220 can also have a calibration apparatus which can be used to calibrate the distance sensor 214, which is known to a person skilled in the art.

In this exemplary embodiment, the position determination unit 220 is mounted by means of four cable ties on struts which are provided for the purpose of fitting the spinner cap. The struts are already usually present in wind power installations 100, which keeps the assembly outlay low. The fitting by means of cable ties likewise makes it possible to quickly dismantle the position determination unit 220.

Figure 5:
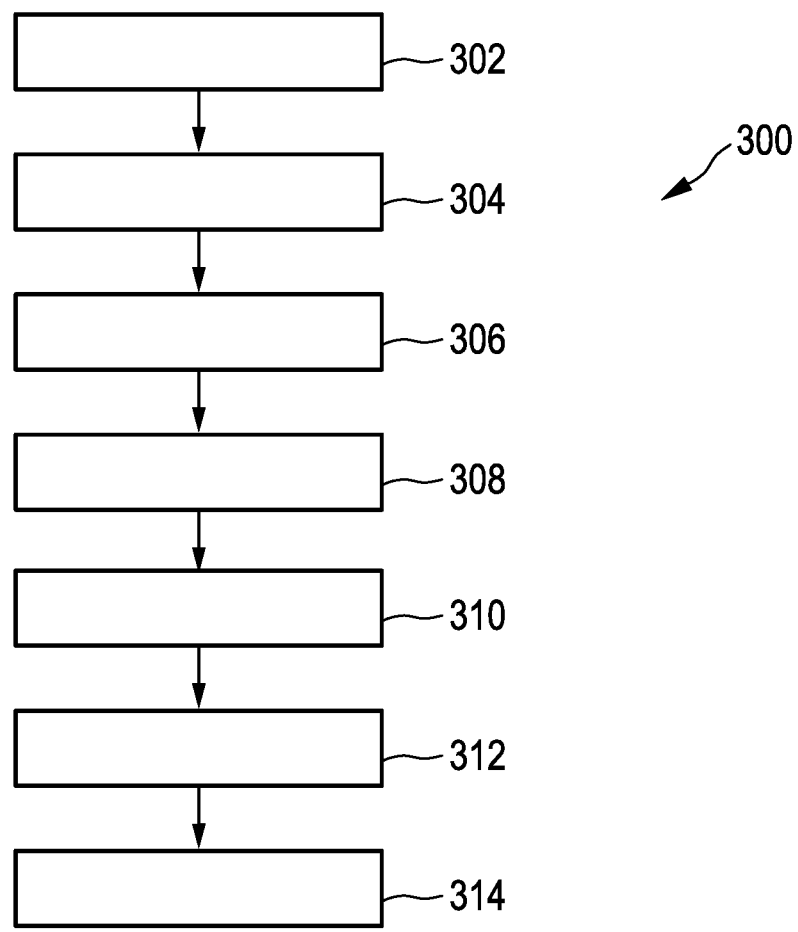
FIG. 5 shows an exemplary flowchart of a measuring method according to the invention.

FIG. 5 shows, schematically and by way of example, a flowchart of a measuring method 300 for measuring a stator 132 of a wind power installation 100. The measuring method 300 comprises a step 302 of mounting an air gap measuring unit 210, which has a holding apparatus 212 and a distance sensor 214, on a rotor 134 of the wind power installation 100. The mounting in step 302 is preferably carried out during a time in which the wind power installation 100 is stopped, with the result that the rotor 134 cannot rotate. The mounting is preferably also carried out on an end face, that is to say from that side of the wind power installation which is generally directed into the wind.

In step 304, a position determination unit 220 is mounted on the rotor 134 of the wind power installation. For example, the position determination unit 220 is mounted on struts which are already present in the rotor 134 by means of cable ties, without being restricted thereto.

In a step 306, the position determination unit 220 is connected to a grid voltage. The grid voltage is typically already available in the wind power installation 100, and the position determination unit 220 can therefore be easily connected.

In step 308, the distance sensor 214 is calibrated. For example, the calibration step is carried out in such a manner that an indication on the position determination unit 220, which indicates the analog scanning value of the distance sensor 214, is used to change the voltage generated by the distance sensor 214 in such a manner that the indicated measured value corresponds to the distance. This is only one example, and further possible calibration methods can be used instead of the method described by way of example.

In step 310, the incremental encoder 222 is referenced for absolute position determination during a revolution. The referencing is preferably carried out using the referencing unit 224. As a result of the referencing, comparable measurements are possible over a plurality of measurements which are carried out in different years, for example, and also between different wind power installations.

Step 312 relates to the actual capture of a signal from the distance sensor 214, which is indicative of an extent of the air gap 154 between the stator 132 and the rotor 134, by means of the position determination unit 220 during a rotation of the rotor 134 at a plurality of revolution positions. The signal from the distance sensor 214 is captured while the rotor 134 rotates around the stator 132. The rotor 134 does not need to be stopped in order to carry out individual measurements, and the measurement can be repeated as often as desired without any additional outlay.

In step 314, the signals captured in step 312 are transmitted by WLAN or by means of another radio transmission protocol. It is therefore easily possible to evaluate the signals outside the rotor, in particular in a non-rotating region of the machine cabin. An engineer can therefore evaluate the captured signals virtually in real time and can possibly adapt the stator 132.

Figure 6:
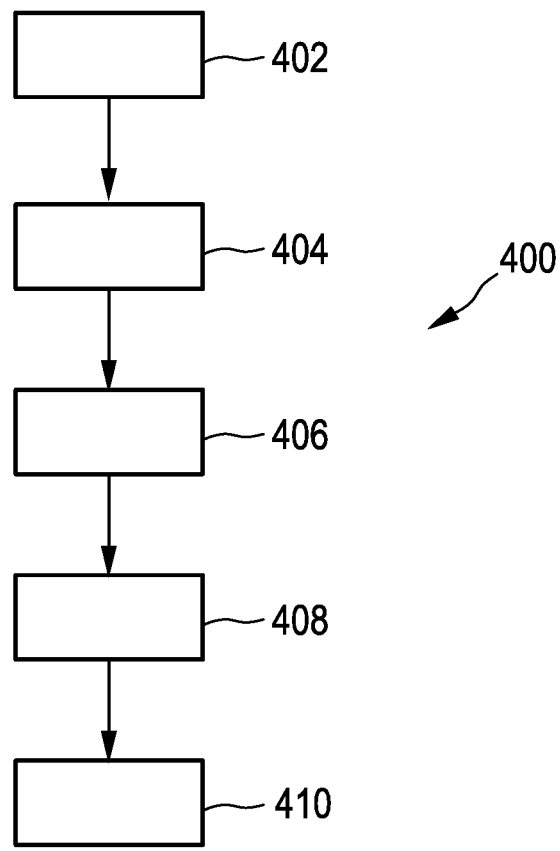
FIG. 6 shows another exemplary flowchart of a measuring method according to the invention, and FIG. 7 schematically shows an exemplary embodiment of a distance sensor.

FIG. 6 shows, schematically and by way of example, a flowchart of a measuring method 400 for measuring a rotor 134 of a wind power installation 100. The measuring method 400 comprises a step 402 of mounting an air gap measuring unit 210, which has a holding apparatus 212 and a distance sensor 214, on a stator 132 of the wind power installation 100. The mounting in step 302 is preferably carried out during a time in which the wind power installation 100 is stopped, with the result that the rotor 134 cannot rotate. The mounting is preferably also carried out on an end face, that is to say from that side of the wind power installation which is generally directed into the wind. Alternatively or additionally, in particular additionally, the mounting is also carried out on the housing side, that is to say on that side of the rotor or generator which faces away from the wind.

In step 404, a signal from the distance sensor 214, which is indicative of an extent of an air gap 154 between the stator 132 and the rotor 134, is captured during a rotation of the rotor 134 at a plurality of revolution positions.

In step 406, junctions between pole shoes of the rotor 134 are determined from the signal from the distance sensor 214. The captured distance reaches a considerably greater value in the junction between two pole shoes than in the region of the pole shoes, which makes it possible to determine the junction.

In step 408, a distance value between the stator 132 and the rotor 134 is determined for each pole shoe between each two adjacent junctions of the determined junctions. In particular, the minimum of the signal from the distance sensor 214 is used for this purpose even though other methods, for example the determination of an average value, are also possible.

In step 410, a roundness of the rotor 134 is evaluated on the basis of the distance value determined for each pole shoe. Adaptations possibly need to be carried out if unroundnesses are determined.

Although the steps are shown in a particular order in FIG. 5 and FIG. 6, this does not imply any necessary temporal sequence, but rather a few, a plurality or all of the steps can be carried out in a different order or else at the same time.

Although the wind power installations are illustrated as internal rotors in the exemplary embodiment, the measuring system and the measuring method can be used in a similar manner and likewise advantageously with external rotors.

Figure 7:
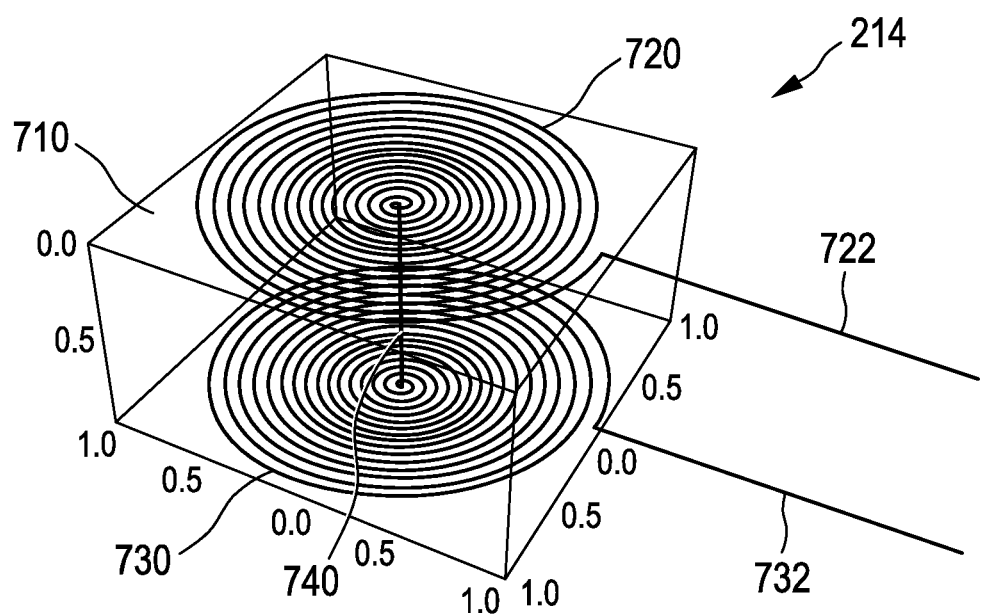

FIG. 7 shows, schematically and by way of example, an exemplary embodiment of a distance sensor 214. In this exemplary embodiment, the distance sensor 214 is in the form of a film 710 which is preferably self-adhesive on one of its two sides in order to enable simple insertion in the air gap, for example. Typical film thicknesses are in the region of 0.1 mm, but thicker or thinner films are also possible.

The film 710 has, on its front side, a spiral conductor track 720 and, on its rear side, a further spiral conductor track 730. The direction of the spiral of the conductor track 730 is preferably opposite that of the spiral 720. In other exemplary embodiments, the spiral 720 and/or the spiral 730 can also be rectangular or have other geometries in order to preferably cover the full stator tooth width in the air gap.

The spiral 720 and the spiral 730 are connected approximately in the center of the film 710 by means of a connection 740 which is in the form of a hole having a soldering point, for example. The distance sensor 214 can therefore be connected via a connection line 722, which is connected to the first spiral 720, and a second connection line 732, which is connected to the second spiral 730.

As described above, the distance sensor 214 shown in FIG. 7 cannot only be adhesively bonded to the stator in order to measure the rotor but can also be adhesively bonded to the rotor in order to measure the stator roundness. Overall, four distance sensors 214 of this type can preferably be used, two on the stator and two on the rotor in each case, one of which is on the spinner side and one of which is on the machine cabin side respectively, which sensors measure unroundness and conicity.

The invention claimed is:

1. A measuring system for measuring a stator of a gearless wind power installation, the measuring system comprising:
    an air gap measuring unit; and
    a position determination unit,
    wherein the air gap measuring unit has a holding apparatus and a distance sensor, wherein the holding apparatus is configured to reversibly mount the air gap measuring unit on a rotor of the wind power installation and rotate with the rotor,
    wherein the distance sensor is configured to provide a signal indicative of a size of an air gap between the stator and the rotor,
    wherein the position determination unit is configured to be reversibly mounted on the rotor of the wind power installation and provide a signal indicative of a position of the position determination unit in a revolution direction of the rotor, and
    wherein the measuring system is configured to capture signals from the distance sensor and from the position determination unit during a rotation of the rotor at a plurality of revolution positions.

2. The measuring system as claimed in claim 1, wherein the holding apparatus comprises a magnetic film, wherein the air gap measuring unit is configured to be mounted in the air gap.

3. The measuring system as claimed in claim 1, wherein the position determination unit has a gyroscope or an incremental encoder configured to provide a signal for each determined angle change of the rotor.

4. The measuring system as claimed in claim 3, wherein the incremental encoder has a resolution of at least 100 positions per revolution.

5. The measuring system as claimed in claim 3, wherein the position determination unit has the incremental encoder, wherein the position determination unit has a referencing unit for referencing the incremental encoder.

6. The measuring system as claimed in claim 1, further comprising a housing, wherein the housing comprises the position determination unit and is set up to be mounted on struts for a spinner cap of the wind power installation.

7. The measuring system as claimed in claim 1, wherein the position determination unit has at least one of a radio communication module or a WLAN module.

8. The measuring system as claimed in claim 1, wherein the distance sensor has at least one of: a sensing plate or a capacitive flat sensor configured to scan an inner side of the stator in a mounted state.

9. The measuring system as claimed in claim 1, wherein the distance sensor enables a measurement accuracy of 0.5 mm or better.

10. The measuring system as claimed in claim 1, wherein the distance sensor is configured to provide an analog scanning signal, and the position determination unit has an analog to digital converter configured to digitize the scanning signal.

11. The measuring system as claimed in claim 1, wherein the position determination unit has a transformer so that the position determination unit is configured to be directly connected to a grid voltage.

12. The measuring system as claimed in claim 1, wherein the air gap measuring unit is a first air gap measuring unit, the measuring system having a second air gap measuring unit, wherein the first air gap measuring unit is configured to be mounted in front of the rotor in an axial direction and the second air gap measuring unit is configured to be mounted behind the rotor in the axial direction.

13. The measuring system as claimed in claim 2, wherein the air gap measuring unit is configured to be mounted on a pole shoe of the rotor.

14. The measuring system as claimed claim 1, wherein the distance sensor of the air gap measuring unit is a single distance sensor configured to provide a plurality of signals indicative of sizes, respectively, of the air gap between the stator and the rotor.

15. A method for measuring a stator of a gearless wind power installation, wherein the method comprises:
    mounting an air gap measuring unit, which has a holding apparatus and a distance sensor, on a rotor of the wind power installation;
    mounting a position determination unit on the rotor of the wind power installation;
    at a first position of the rotor, capturing a first signal from the distance sensor using the position determination unit, the first signal being indicative of a size of an air gap between the stator and the rotor at the first position;
    rotating the rotor to a second position such that the air gap measuring unit moves with the rotor to the second position; and
    capturing a second signal from the distance sensor using the position determination unit, the second signal being indicative of a size of the air gap between the stator and the rotor at the second position.

16. The method as claimed in claim 15, further comprising continuing to rotate the rotor to a subsequent position and capturing a subsequent signal, wherein the subsequent signal from the distance sensor is captured for each subsequent position indicated by an incremental encoder.

17. The method as claimed in claim 16, further comprising at least one of:
    connecting the position determination unit to a grid voltage;
    calibrating the distance sensor;
    referencing the incremental encoder for absolute position determination during a revolution; and
    transmitting the captured signals by WLAN.

18. A method for assembling a wind power installation, comprising:
- carrying out a measuring method as claimed in claim 15; and
- adjusting at least one of: the stator or the rotor at a position for which a differing value of the air gap was measured.

19. A method for measuring a rotor of a gearless wind power installation, wherein the method comprises:
- mounting an air gap measuring unit on the rotor of the wind power installation, the air gap measuring unit having a holding apparatus and a single distance sensor;
- capturing signals from the single distance sensor during a rotation of the rotor at a plurality of revolution positions, wherein the signals are indicative of an air gap between a stator and the rotor;
- determining junctions between pole shoes of the rotor from the signal from the distance sensor;
- determining a distance value between the stator and the rotor for each pole shoe between each two adjacent junctions of the determined junctions;
- evaluating a roundness of the rotor on a basis of the distance value determined for each pole shoe; and
- removing the air gap measuring unit from the rotor.

20. The method as claimed in claim 19, further comprising a distance value between the stator and the rotor for each pole shoe between each two adjacent junctions of the determined junctions as a minimum of the signal from the distance sensor.

* * * * *

UNITED STATES PATENT AND TRADEMARK OFFICE
CERTIFICATE OF CORRECTION

PATENT NO. : 11,365,988 B2
APPLICATION NO. : 16/464416
DATED : June 21, 2022
INVENTOR(S) : Uli Krause et al.

Page 1 of 1

It is certified that error appears in the above-identified patent and that said Letters Patent is hereby corrected as shown below:

In the Claims

Column 12, Claim 14, Line 32:
"The measuring system as claimed claim 1,"
Should read:
--The measuring system as claimed in claim 1,"--

Column 13, Claim 20, Lines 25-26:
"further comprising a distance value"
Should read:
--further comprising determining a distance value--

Signed and Sealed this
Thirtieth Day of July, 2024

Katherine Kelly Vidal
*Director of the United States Patent and Trademark Office*